(12) United States Patent
Prince et al.

(10) Patent No.: US 6,611,250 B1
(45) Date of Patent: Aug. 26, 2003

(54) FOOT PEDAL COMPUTER MOUSE INCLUDING MODULAR AUXILIARY UNIT

(76) Inventors: Peter M. Prince, 1258 Spring Hill Rd., McLean, VA (US) 22102-2300; David C. Wujcik, 8102 Falstaff Rd., McLean, VA (US) 22102-2300; Jonathan Price, 4326 Lorcom La., Arlington, VA (US) 22207

( * ) Notice: Subject to any disclaimer, the term of this patent is extended or adjusted under 35 U.S.C. 154(b) by 72 days.

(21) Appl. No.: 09/598,175

(22) Filed: Jun. 21, 2000

Related U.S. Application Data

(60) Provisional application No. 60/139,792, filed on Jun. 21, 1999, and provisional application No. 60/139,793, filed on Jun. 21, 1999.

(51) Int. Cl.[7] .................................................. G09G 5/00
(52) U.S. Cl. ........................ 345/163; 345/167; 345/157
(58) Field of Search ................................ 345/156–179; 463/36, 37; 340/825.1

(56) References Cited

U.S. PATENT DOCUMENTS

| | | | |
|---|---|---|---|
| 4,816,810 A | | 3/1989 | Moore |
| 5,148,152 A | | 9/1992 | Stueckle et al. |
| 5,252,970 A | * | 10/1993 | Baronowsky ................ 341/20 |
| 5,305,449 A | | 4/1994 | Ulenas |
| 5,334,997 A | * | 8/1994 | Scallon ....................... 345/167 |
| 5,422,521 A | * | 6/1995 | Neer et al. .................. 307/119 |
| 5,463,388 A | | 10/1995 | Boie et al. |
| 5,530,455 A | * | 6/1996 | Gillick et al. ................ 345/163 |
| 5,552,807 A | | 9/1996 | Hayes et al. |
| 5,633,658 A | | 5/1997 | Ma |
| 5,694,152 A | | 12/1997 | Loop |
| 5,745,055 A | | 4/1998 | Redlich et al. |
| 5,751,274 A | | 5/1998 | Davis |
| 5,812,114 A | | 9/1998 | Loop |
| 5,838,305 A | | 11/1998 | Bookstein |
| 5,841,426 A | | 11/1998 | Dodson et al. |
| 5,861,870 A | | 1/1999 | Anderson |
| 5,864,333 A | | 1/1999 | O'Heir |
| 5,886,685 A | | 3/1999 | Best |
| 5,907,318 A | * | 5/1999 | Medina ...................... 345/163 |
| 5,914,701 A | | 6/1999 | Gersheneld et al. |
| 6,128,006 A | * | 10/2000 | Rosenberg et al. ......... 345/163 |
| 6,138,079 A | * | 10/2000 | Putnam ....................... 702/50 |
| 6,359,611 B2 | * | 3/2002 | Chen .......................... 345/156 |

* cited by examiner

Primary Examiner—Amare Mengistu
Assistant Examiner—Mansour M. Said
(74) Attorney, Agent, or Firm—Nixon & Vanderhye P.C.

(57) ABSTRACT

A mouse assembly includes a modular auxiliary unit that is operable in complement with a floor or pedal assembly. The modular auxiliary unit includes structure for conveniently securing the unit as well as a mouse functionality section, such as a track ball or the like. The floor or pedal assembly includes one or more clicking pedals and a scrolling wheel for foot-operated mouse manipulations. The assembly facilitates mouse-type operations while reducing risks of injury associated with repetitive motions such as carpal tunnel syndrome and tendinitis.

10 Claims, 2 Drawing Sheets

FOOT PEDAL COMPUTER MOUSE INCLUDING MODULAR AUXILIARY UNIT

This application claims the benefit of U.S. Provisional Patent Application Ser. No. 60/139,792, filed Jun. 21, 1999, and U.S. Provisional Patent Application Ser. No. 60/139,793, filed Jun. 21, 1999, the entire contents of which are herein incorporated by reference.

BACKGROUND OF THE INVENTION

The present invention relates to a computer mouse apparatus and, more particularly, to a computer mouse apparatus that is adapted for use by a user's feet and including a modular auxiliary unit for additional functionality.

Conventional hand mouse operation can be uncomfortable particularly over extended periods of time and has been known to be the cause of stress injuries or repetitive motion injuries such as carpal tunnel syndrome and tendinitis. It is desirable to perform computer mouse manipulations with a user's feet to reduce such stress injuries and increase the user's comfort.

A number of existing foot pedal mouse devices have appreciated the desirability of performing mouse operations with the user's feet. These devices, however, are typically multi-pedal systems that are bulky and uncomfortable to use as well as being expensive. The existing foot mouse pedals are also limited in mouse operation functionality.

SUMMARY OF THE INVENTION

In accordance with an exemplary embodiment of the invention, a computer mouse assembly includes a foot pedal with at least one contact switch and a scrolling wheel. The foot pedal has an output device for communication with a computer. The computer mouse assembly also includes a modular auxiliary unit cooperating with the foot pedal for merged communication with the computer, wherein the modular auxiliary unit provides added mouse functionality to the foot pedal.

In a preferred embodiment, the modular auxiliary unit includes a track ball. In this context, the scrolling wheel translates linear motion by rotation about a central axis, and the track ball translates multi-directional motion by rotation about a central point. In one embodiment, the modular auxiliary unit includes a clip having cooperating surfaces that is configured to attach the modular auxiliary unit to a user's article of clothing. Alternatively, the modular auxiliary unit may include a strap for securing the unit in a convenient location.

The foot pedal preferably includes two contact switches operable with a left click pedal and a right click pedal, respectively. The foot pedal may additionally include a third contact switch that is operable with the scrolling wheel. The left click pedal and the right click pedal are positioned adjacent each other in a side-to-side relationship, and the scrolling wheel is disposed above the left and right click pedals.

With this construction, computer screen operations such as pointing, clicking, holding, scrolling, highlighting, dragging and the like can be performed using two compact apparatuses, wherein, for example, pointing operations can be performed by hand using a track ball on the modular auxiliary unit while clicking, holding and scrolling operations can be performed with a user's right and/or left foot with a pedal that includes one or two switches and a scroll wheel. The specific parameters and mouse functionality performed by the components can be customized to a user's particular needs, and the invention is not meant to be limited to the described examples. For example, in one arrangement, highlighting and dragging operations can be performed by using the track ball or other device such as a touch pad and pedal simultaneously.

With this system, stress injuries from repetitive motion can be reduced, and operator comfort can be increased. In this context, it is more comfortable to operate the clip-on track ball of the auxiliary unit because the user's arm is not extended, and it is also more comfortable to operate a single pedal with one foot while resting the user's other foot on the floor.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

In preferred forms, the computer mouse assembly according to the present invention is formed of two parts, a modular auxiliary unit 12 and a floor assembly or foot pedal 14. Since the devices may be operable independently, the invention is not meant to be necessarily limited to a computer mouse assembly incorporating both devices. Moreover, the detailed circuit components effecting operation of the devices 12, 14 and interfacing with a computer via the described cables is generally known, and those of ordinary skill in the art could contemplate alternative configurations for the electronics to achieve the functionality described herein. The electronic circuitry of the assembly thus does not form part of the present invention, and the details thereof will not be further described. Examples of such circuitry can be found in, for example, U.S. Pat. Nos. 5,305,449, 5,463,388 and 5,633,658, the disclosures of which are hereby incorporated by reference.

Figure 1:
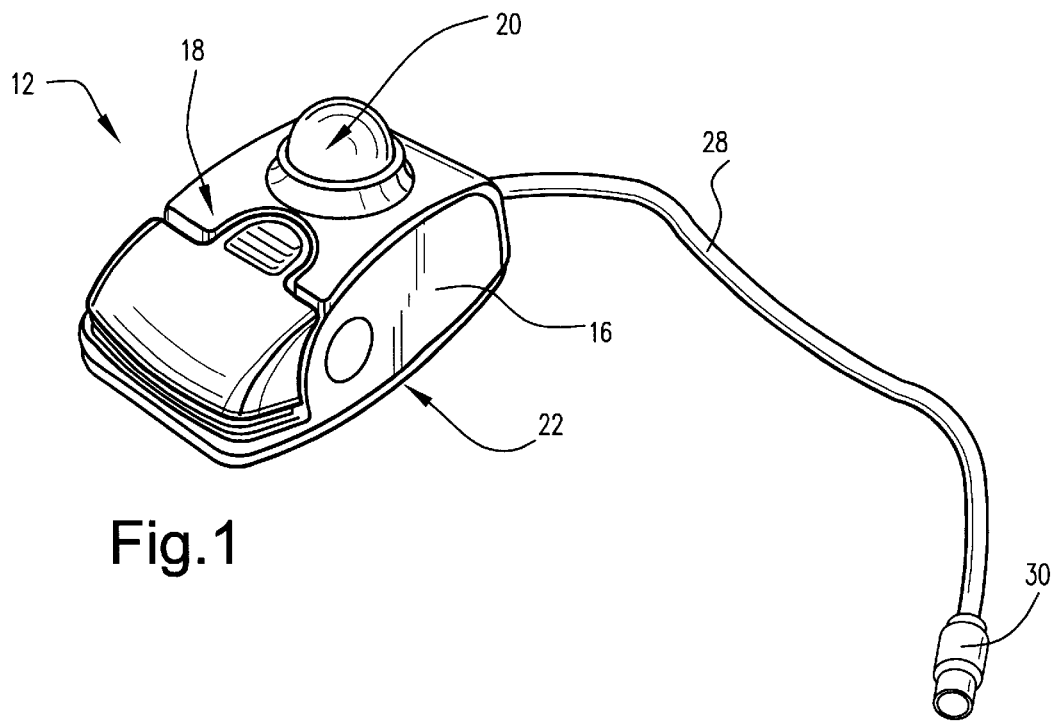
FIG. 1 is a perspective view of the modular auxiliary unit of the mouse assembly according to the present invention.

Referring to FIG. 1, the modular auxiliary unit 12 is constructed of a housing 16 including a clip section 18 and a mouse functionality section 20 such as where a track ball is shown in FIG. 1. A base pad 22 is secured to an underside of the housing 16 to provide a firm contact with a supporting surface or a user's body. The base pad 22 may also incorporate a second clip 23 for a pocket attachment or the like (FIG. 2).

Figure 2:
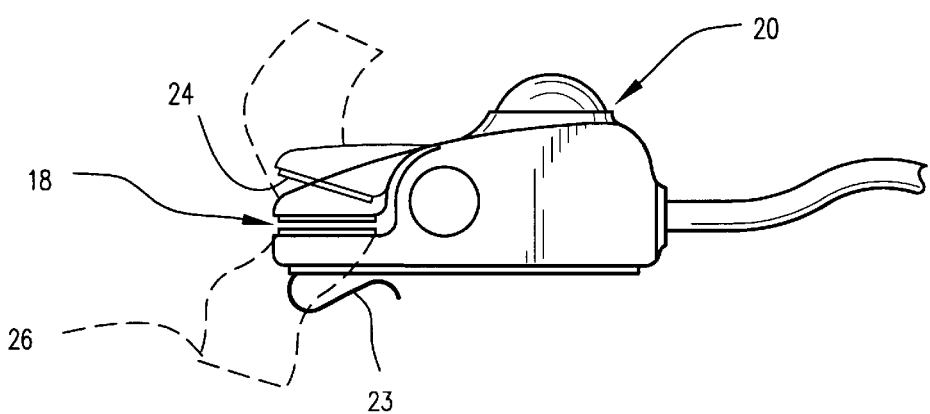
FIG. 2 is a side view of the modular auxiliary unit shown in FIG. 1.

The clip section 18, as shown in FIG. 2, includes a clip having opposing cooperating gripping surfaces 24 formed with, for example, rubber or like construction to attach the unit 12 to a user's article of clothing. In an alternative arrangement shown in phantom in FIG. 2, the clipping section 18 can include a strap 26 with a suitable fastening means such as a hook and loop fastener or the like. With the strap arrangement, the unit 12 can be secured to any location that is convenient to the user's operating hand when the user's hand is in a relaxed and resting state. For example, using the strap 26, the unit 12 can be secured to the arm of the user's chair.

The mouse functionality section 20 shown in FIGS. 1 and 2 includes a track ball, which operation is conventional. Generally, the track ball is rotatable in multiple directions about a single point at the center of the ball. The ball, which is typically a rubber or other gripping-type surface ball, engages a plurality of linear motion sensors that translate motion of the track ball into multi-directional control of a cursor on the computer screen or the like. For ease of use, the track ball may be coupled with a two-dimensional linear motion encoder that translates rotation of the track ball into linear two-direction motion only, such as side to side on a computer screen, for example.

A shielded cable extension 28 is coupled with the unit circuitry and terminates in a single plug 30 that is coupleable with a complementary plug in the pedal assembly 14 or alternatively directly with the computer. The single plug 30 may be provided with an optional breakaway connection safety feature. As an alternative to the cable extension 28 and plug 30, the modular auxiliary unit may be wireless.

Figure 3:
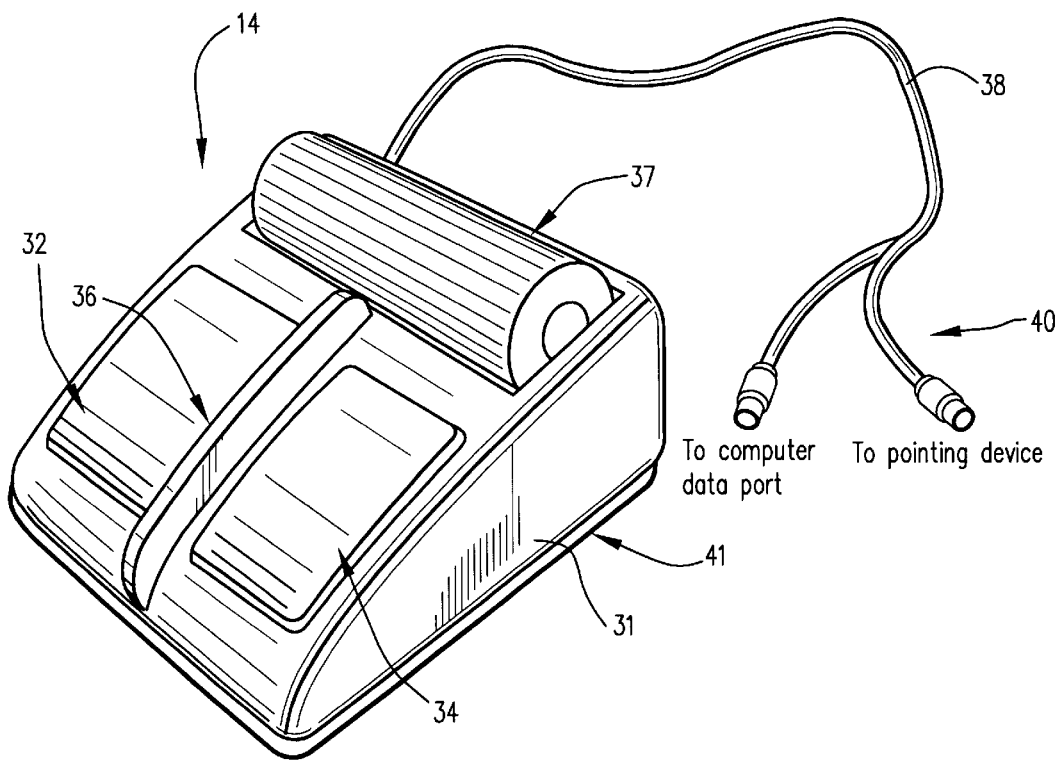
FIG. 3 is a perspective view of the foot pedal according to the present invention.
Figure 4:
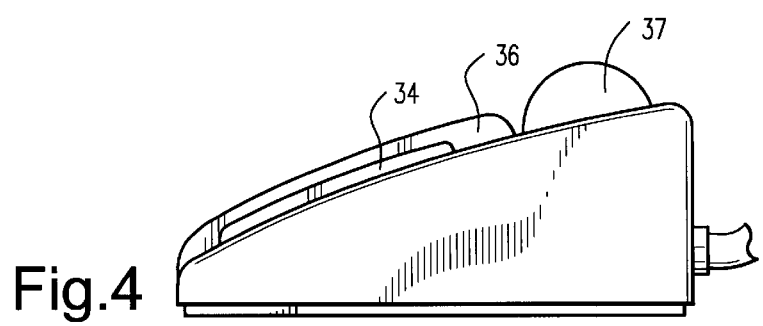
FIG. 4 is a side view of the foot pedal shown in FIG. 3.

Referring to FIGS. 3 and 4, the floor or pedal assembly 14 includes a pedal housing 31 supporting a left click pedal 32 and a right click pedal 34 separated by a tactile blade 36 such as a hard plastic strip or the like. A base pad 41 is secured to an underside of the housing 31 to provide a firm contact with a supporting surface.

The left click pedal 32 and right click pedal 34 are coupled with corresponding momentary contact switches (not shown) in the housing 31 that effect mouse functionality according to preestablished operating parameters. That is, typically, one button of a conventional mouse is used as a click switch or selecting switch while the other button is an option click switch or the like. These functions can be reversed or altered according to user preferences. As noted, the circuitry effecting computer control by operation of the pedals is known and the details thereof will not be further described.

Positioned above the left click pedal 32 and right click pedal 34 is a scroll wheel 37 with a textured surface that is rotatable about a central axis. The scroll wheel 37 engages at least one linear motion sensor or the like that is coupled with appropriate circuitry. Signals from the pedal assembly 14 are communicated to the computer via a shielded cable 38 terminating in a dual plug 40. As an alternative to the cable 38 and plug 40, the foot pedal component may be wireless.

The scroll wheel 37 is operated by forward or backward motion of a user's foot. Forward motion of the foot against the roller causes, for example, the computer screen display to scroll upward (toward the top of the display), and backward motion of the foot against the roller, for example, causes the display to scroll downward (toward the bottom of the display). The scrolling rate is controlled by the speed of the foot motion. Of course, the functionality of the scroll wheel operation may also be configured according to user preferences. The scroll wheel 37 may additionally include "clicking" functionality by incorporating a contact switch adjacent the scroll wheel 37 and configuring the scroll wheel 37 for deflection in a direction perpendicular to the axis of rotation to activate the contact switch. Such a contact switch would preferably require a firmer activation to prevent accidental activation during regular use.

The left and right click pedals 32, 34 are used for single- and double-clicking and for holding, highlighting and dragging in conjunction with the modular auxiliary unit 12 to perform computer operations. As shown, one end of the dual plug 40 receives the cable from the modular auxiliary unit 12, and the other end communicates with the computer. Dual plugs serve to merge the data stream from the modular auxiliary unit 12 with the signals from the pedal assembly 14, providing an output that is electrically and data compatible with the mouse port on a computer.

With the construction of the computer mouse assembly according to the present invention, computer mouse manipulations are facilitated while reducing discomfort to the user as well as the susceptibility to stress and repetitive motion related injuries. The assembly is lightweight, compact and easy to use while being inexpensive to manufacture.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A computer mouse assembly comprising:
   a foot pedal including a pedal housing supporting at least one contact switch and a scrolling wheel, the foot pedal having an output device for communication with a computer, wherein the scrolling wheel extends across substantially an entire width of the pedal housing; and
   a modular auxiliary unit cooperating with the foot pedal for merged communication with the computer, wherein the modular auxiliary unit provides added mouse functionality to the foot pedal.

2. A computer mouse according to claim 1, wherein the modular auxiliary unit comprises a clip including opposing cooperating gripping surfaces, the clip being configured to attach the modular auxiliary unit to a user's article of clothing.

3. A computer mouse according to claim 1, wherein the modular auxiliary unit comprises a strap for securing the modular auxiliary unit in a convenient location.

4. A computer mouse according to claim 1, wherein the scrolling wheel translates linear motion by rotation about a central axis.

5. A computer mouse according to claim 1, wherein the foot pedal comprises two contact switches operable with a left click pedal and a right click pedal, respectively.

6. A computer mouse according to claim 5, wherein the foot pedal comprises a third contact switch operable with the scrolling wheel.

7. A computer mouse according to claim 5, wherein the left click pedal and the right click pedal are positioned adjacent each other in a side-to-side relationship, and wherein the scrolling wheel is disposed above the left and right click pedals.

8. A computer mouse according to claim 1, wherein the modular auxiliary unit is hand-operable.

9. A computer mouse according to claim 8, wherein the modular auxiliary unit comprises a trackball.

10. A computer mouse according to claim 9, wherein the trackball translates multi-directional motion by rotation about a central point.

* * * * *

UNITED STATES PATENT AND TRADEMARK OFFICE
CERTIFICATE OF CORRECTION

PATENT NO.     : 6,611,250 B1
DATED          : August 26, 2003
INVENTOR(S)    : Prince et al.

It is certified that error appears in the above-identified patent and that said Letters Patent is hereby corrected as shown below:

<u>Title page,</u>
Item [76], Inventors "Peter M. Prince" should read -- Peter M. Princiotto -- and insert the following inventor name -- Michael J. Rivers --

Signed and Sealed this

Eleventh Day of May, 2004

JON W. DUDAS
*Acting Director of the United States Patent and Trademark Office*